(12) United States Patent
Kuboniwa

(10) Patent No.: US 6,879,591 B1
(45) Date of Patent: Apr. 12, 2005

(54) TRANSFERRING VOICE OVER AN ASYMMETRIC DIGITAL SUBSCRIBER LINE

(75) Inventor: Osamu Kuboniwa, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/450,768

(22) Filed: Nov. 30, 1999

(30) Foreign Application Priority Data

Nov. 30, 1998 (JP) .......................................... 10-340854

(51) Int. Cl.$^7$ .............................. H04L 12/28; H04J 3/04
(52) U.S. Cl. ................................ 370/395.1; 370/395.6; 370/434; 370/493
(58) Field of Search .......................... 370/395.1, 395.4, 370/395.6, 401, 422, 421, 434, 458, 537, 538, 542, 543, 493

(56) References Cited

U.S. PATENT DOCUMENTS

| | | | | | |
|---|---|---|---|---|---|
| 6,141,339 | A | * | 10/2000 | Kaplan et al. | 370/395.61 |
| 6,141,377 | A | * | 10/2000 | Sharper et al. | 375/222 |
| 6,205,124 | B1 | * | 3/2001 | Hamdi | 370/260 |
| 6,243,377 | B1 | * | 6/2001 | Phillips et al. | 370/354 |
| 6,246,695 | B1 | * | 6/2001 | Seazholtz et al. | 370/468 |
| 6,259,708 | B1 | * | 7/2001 | Cheng et al. | 370/493 |
| 6,282,189 | B1 | * | 8/2001 | Eames | 370/352 |
| 6,404,774 | B1 | * | 6/2002 | Jenness | 370/465 |
| 6,407,997 | B1 | * | 6/2002 | DeNap et al. | 370/352 |

FOREIGN PATENT DOCUMENTS

| | | |
|---|---|---|
| JP | 5-268381 | 10/1993 |
| JP | 6-85962 | 3/1994 |
| JP | 9-135241 | 5/1997 |
| JP | 10-271213 | 10/1998 |
| JP | 10-294730 | 11/1998 |
| JP | 2000-511724 | 9/2000 |

OTHER PUBLICATIONS

The International Engineering Consortium, www.iec.org, Asymmetric Digital Subscriber Line (ADSL).*
The International Engineering Consortium, www.iec.org, Voice–over–Digital Subscriber Line (VoDSL) Service–New Revenue from Existing Infrastructure.*
Japanese Office Action dated May 22, 2001, with partial English translation.

* cited by examiner

Primary Examiner—John Pezzlo
Assistant Examiner—Saba Tsegaye
(74) Attorney, Agent, or Firm—McGinn & Gibb, PLLC

(57) ABSTRACT

An asymmetrical digital subscriber line (ADSL) system for transferring an analog audio signal and high speed digital data on the side of a subscriber, from and to a station, through one ADSL subscriber line, includes an apparatus on the subscriber side which converts an analog audio signal into a digital audio signal. The apparatus includes a line concentrator to concentrate the audio signal together with high-speed digital data by time division, and supplied to the subscriber line after modulation. An apparatus on the station side simultaneously supplies a signal received from the subscriber side to an analog telephone network, and supplies high-speed digital data to a high-speed digital data network. Each digital audio signal as well as each high-speed digital data is converted into asynchronous transfer mode (ATM) cells in each respective line concentrator, and each destination address is attached to the ATM cells.

20 Claims, 3 Drawing Sheets

TRANSFERRING VOICE OVER AN ASYMMETRIC DIGITAL SUBSCRIBER LINE

BACKGROUNDS OF THE INVENTION

1. Field of the Invention

The present invention relates to an ADSL system for transferring an analog audio signal and a high-speed digital data through one subscriber line, and more particularly to an ADSL system capable of transferring the same without using POTS splitter.

2. Description of the Related Art

FIG. 3 is a view showing an example of the structure of the conventional ADSL (Asymmetric Digital Subscriber Line) system. As illustrate in FIG. 3, in the conventional ADSL system, high-speed digital data transferred from and to a high-speed data apparatus 31 on a subscriber side, after being modulated and demodulated by an ADSL modem 32, is transferred from and to a station through the same subscriber line 35 by an integrated separator 33, together with an analog audio signal sent and received through an analog telephone 34 on the subscriber side, in such a state that they are integrally divided by the frequency. On the station side, after being modulated and demodulated by an ADSL modem 37, the high-speed digital data from a high-speed digital data network 36, together with an analog audio signal sent and received through an analog telephone network 39, is transferred from and to the subscriber through a subscriber line 35 by the an integrated separator 38, in such a state that they are integrally divided by the frequency.

The conventional ADSL system thus constituted must be provided with an integrated separator (filter) for separating an analog audio signal and high-speed digital data, called a POTS (Plain Old Telephone Service) splitter, on the both sides of a station and a subscriber. Therefore, the conventional system has the following problems.

At first, since the POTS splitter consists of coils and a condenser of large size, especially, the station side has to accommodate a large number of subscribers, thereby increasing the volume thereof.

At second, in order to set a POTS splitter on a subscriber side, a constructor has to go to the subscriber's site to do setting and wiring works. In other words, it is difficult for a subscriber to set the splitter and he or she must pay the labor costs for dispatching a constructor.

At third, when setting a POTS splitter on an existing analog telephone network, because the POTS splitter is directly connected to a subscriber line, there is a fear of disturbing the quality of the subscriber line that has been in the ordinal state. Therefore, it is necessary to optimize the design of the POTS splitter not to disturb the quality of the subscriber line.

At fourth, terminal impedance of a subscriber line varies depending on each country, optimization of the POTS splitter requires each design suitable for the terminal impedance of each country, thereby increasing the development costs for arrangement depending on each country.

SUMMARY OF THE INVENTION

In order to solve the above problems, a first object of the present invention is to provide an ADSL system with no need of a POTS splitter.

A second object of the present invention is to provide an ADSL system capable of downsizing an apparatus on a station side by eliminating a POTS splitter from the station.

A third object of the present invention is to provide an ADSL system capable of providing a subscriber with easy setting and providing a station side with reduction in the labor for construction.

According to one aspect of the invention, a ADSL system for transferring an analog audio signal of analog communication equipment and high speed digital data of high speed digital data equipment provided on the side of a subscriber, from and to a station, through one subscriber line, comprises an apparatus on the subscriber side in which an analog audio signal of the analog communication equipment is converted into a digital audio signal, the data together with the high-speed digital data is concentrated on lines in a way of time division, and supplied to the subscriber line after being modulated by an ADSL modem, while after a signal received from the station through the subscriber line is demodulated by an ADSL modem, the digital audio signal is converted in an analog audio signal and supplied to the analog communication equipment, and at the same time high-speed digital data is supplied to a high-speed digital data equipment, and an apparatus on the station side in which a signal received from the apparatus on the subscriber side through the subscriber line is demodulated by the ADSL modem, thereafter the digital audio signal is converted into an analog audio signal, which is supplied to an analog telephone network, and at the same time high-speed digital data is supplied to a high-speed digital data network, while an analog audio signal of the analog telephone network is converted into a digital audio signal, the data together with high-speed digital data of the high-speed digital data network is concentrated on lines in a way of time division, and supplied to the subscriber line after being modulated by the ADSL modem.

In the preferred construction, the apparatus on the subscriber side converts each analog audio signal of a plurality of analog communication equipment into each digital audio signal and concentrates the data together with high-speed digital data on lines in a way of time division.

In another preferred construction, the apparatus on the subscriber side and apparatus on the station side convert each digital audio signal as well as high-speed digital data into ATM cells, attach each destination address to the ATM cells, and concentrate the data on lines.

In another preferred construction, the apparatus on the subscriber side converts each analog audio signal of a plurality of analog communication equipment into each digital audio signal and concentrates the data together with high-speed digital data on lines in a way of time division, and the apparatus on the subscriber side and apparatus on the station side convert each digital audio signal as well as high-speed digital data into ATM cells, attach each destination address to the ATM cells, and concentrate the data on lines.

In another preferred construction, the apparatus on the subscriber side and apparatus on the station side divide each digital audio signal as well as high-speed digital data into fixed time slots and the data is supplied to the subscriber line after being modulated by the ADSL modem.

In another preferred construction, the apparatus on the subscriber side converts each analog audio signal of a plurality of analog communication equipment into each digital audio signal and concentrates the data together with high-speed digital data on lines in a way of time division, and the apparatus on the subscriber side and apparatus on the station side divide each digital audio signal as well as high-speed digital data into fixed time slots and the data is supplied to the subscriber line after being modulated by the ADSL modem.

According to another aspect of the invention, a ADSL system for transferring an analog audio signal of analog communication equipment and high speed digital data of high speed digital data equipment provided in an apparatus on a subscriber side, from and to an apparatus on a station side, through one subscriber line, in which the apparatus on the subscriber side comprises an AD/DA converter for converting an analog audio signal of the analog communication equipment into a digital audio signal or converting a digital audio signal into an analog audio signal, hence to supply the same to the analog communication equipment, and supplying the high-speed digital data to the high-speed digital data equipment, a line concentrator for concentrating the digital audio signal and the high-speed digital data on lines in a way of time division, and an ADSL modem for modulating the digital audio signal and the high-speed digital data and supplying the modulated signal to the subscriber line, and demodulating a modulated signal received from the station side through the subscriber line, while the apparatus on the station side comprises an ADSL modem for demodulating the modulated signal received from the apparatus on the subscriber side through the subscriber line and modulating a digital audio signal and high-speed digital data to be supplied to the subscriber line, and a line concentrator for supplying the digital audio signal modulated by the ADSL modem to the analog telephone network as well as supplying the high-speed digital data to the high-speed digital data network, and concentrating the digital audio signal from the analog telephone network and the high-speed digital data from the high-speed digital data network on lines in a way of time division, then to send the data to the ADSL modem.

In the preferred construction, the apparatus on the subscriber side comprises a plurality of the above-mentioned AD/DA converters corresponding to a plurality of analog communication equipment, and the line concentrator in the apparatus on the subscriber side concentrates on lines each digital audio signal converted by the plurality of AD/DA converters, together with high-speed digital data, in a way of time division.

In another preferred construction, the line concentrators in the apparatus on the subscriber side and in the apparatus on the station side convert digital audio signals and high-speed digital data into ATM cells, attach each destination address to the ATM cells, and concentrate the data on lines.

In another preferred construction, the apparatus on the subscriber side comprises a plurality of the above-mentioned AD/DA converters corresponding to a plurality of analog communication equipment, and the line concentrators in the apparatus on the subscriber side and in the apparatus on the station side convert digital audio signals and high-speed digital data into ATM cells, attach each destination address to the ATM cells, and concentrate the data on lines.

In another preferred construction, the line concentrators in the apparatus on the subscriber side and in the apparatus on the station side divide each digital audio signal and high-speed digital data into fixed time slots, and the data is supplied to the subscriber line after being modulated by the ADSL modem.

In another preferred construction, the apparatus on the subscriber side comprises a plurality of the above-mentioned AD/DA converters corresponding to a plurality of analog communication equipment, and the line concentrators in the apparatus on the subscriber side and in the apparatus on the station side divide each digital audio signal and high-speed digital data into fixed time slots, the data is supplied to the subscriber line after being modulated by the ADSL modem.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
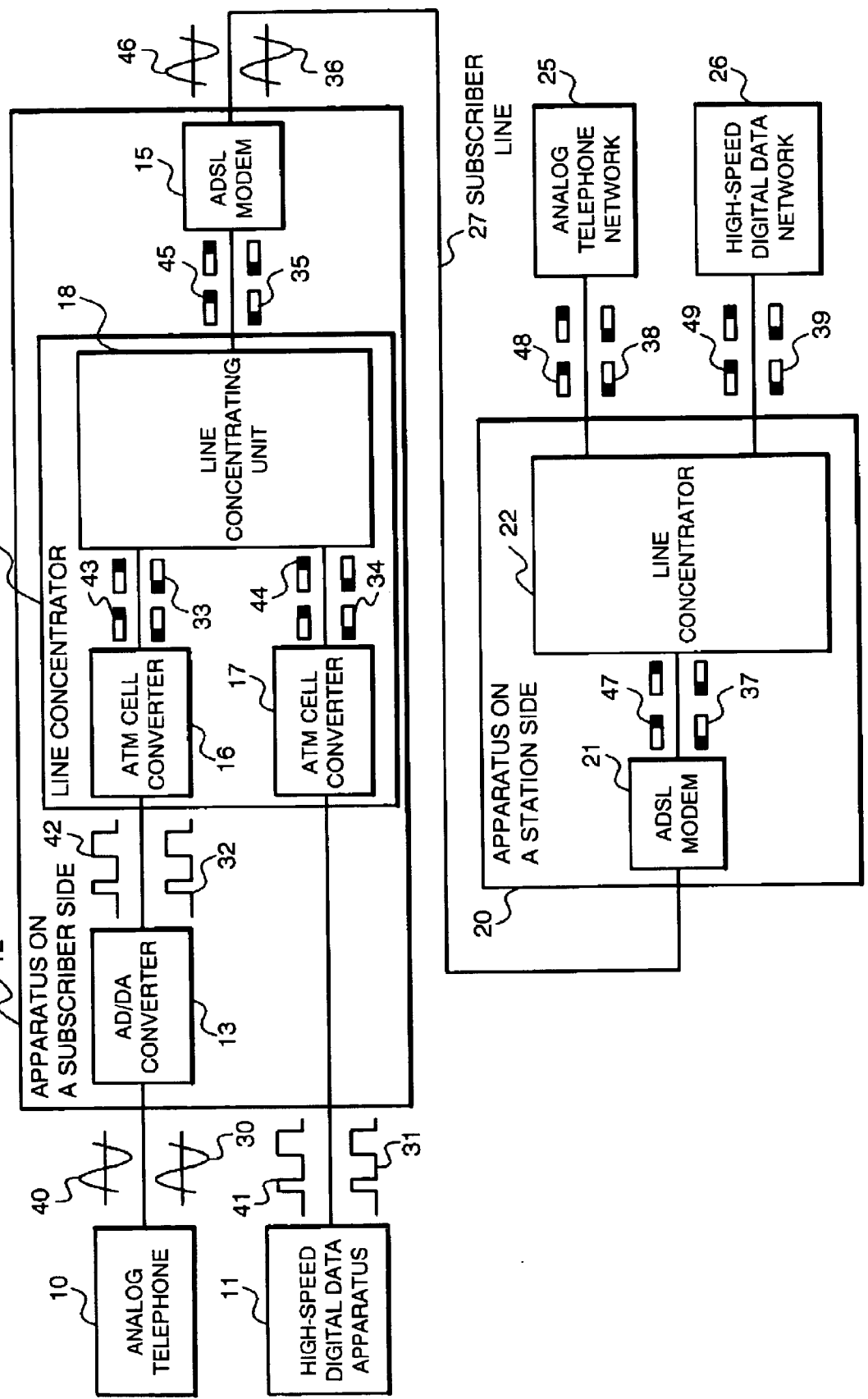
FIG. 1 is a block diagram showing the structure of an ADSL system according to a first embodiment of the present invention.

FIG. 1 shows the system structure according to a first embodiment of the present invention. As illustrated in FIG. 1, an analog audio signal transferred from an analog telephone 10 on a subscriber side is converted into digital by an AD/DA converter 13 within an apparatus 12 on the subscriber side, and transferred to a line concentrator 14 within the apparatus 12 on the subscriber side as digital data.

High-speed digital data from a high-speed digital data apparatus 11 is transferred to the line concentrator 14 within the apparatus 12 on the subscriber side.

The line concentrator 14 divides the digital data from the AD/DA converter 13 into ATM cells through an ATM cell converter 16, and after attaching each destination address (VPI/VCI) to the cells, a line concentrating unit 18 concentrates the data on lines and transfers the data to an ADSL modem 15 within the apparatus 12 on the subscriber side. The line concentrator 14 divides the high-speed digital data into ATM cells through an ATM cell converter 17, and after attaching each destination address (VPI/VCI) to the cells, the line concentrating unit 18 concentrates the data on lines and transfers the data to the ADSL modem 15 within the apparatus 12 on the subscriber side.

The ADSL modem 15 modulates the ATM cells received from the line concentrator 14 and transfers this modulated signal to a subscriber line 27.

An ADSL modem 21 within an apparatus 20 on a station side extracts the ATM cells by demodulating the signal received from the apparatus 12 on the subscriber side through the subscriber line 27 and sends them to a line concentrator 22 within the apparatus 20 on the station side. The line concentrator 22 judges whether each ATM cell extracted by the ADSL modem 21 belongs to the digital data which an analog audio signal from the analog telephone 10 is converted into, or the high-speed digital data from a high-speed digital data apparatus 11, according to the VPI/VCI. The line concentrator 22 sends the ATM cells from the analog telephone 10 or the digital data extracted from the ATM cells to an analog telephone network 25 and sends the ATM cells from the high-speed digital data apparatus 11 or the high-speed digital data extracted from the ATM cells to a high-speed digital data network 26.

On the contrary, the line concentrator 22 within the apparatus 20 on the station side attaches the respective separate destination address (VPI/VCI) to the high-speed digital data received from the high-speed digital data network 26 or the ATM cells accommodating the same high-speed digital data, and the audio data received from the analog telephone network 25 and converted into digital or the ATM cells accommodating the same digital audio data, and then concentrates the data on lines, so to send the above to the ADSL modem 21. The ADSL modem 21 modulates the ATM cells received from the line concentrator 22, so to send the same to the subscriber line 27.

While, the ADSL modem 15 within the apparatus 12 on the subscriber side demodulates the signal received through the subscriber line 27 from the apparatus 20 on the station side and extracts the ATM cells, so to send the same to the line concentrator 14. In the line concentrator 14, the line concentrating unit 18 judges whether the ATM cells respectively belong to the digital data which an analog audio signal from the analog telephone network 25 is converted into, or the high-speed digital data from the high-speed digital data network 26, according to the VPI/VCI of the ATM cells. The line concentrator 14 sends the ATM cells from the analog telephone network 25 to the AD/DA converter 13 through the ATM cell converter 16 and sends the ATM cells from the high-speed digital data network 26 to the high-speed digital data apparatus 11 through the ATM cell converter 17.

The ATM cell converter 16 extracts the digital data which an analog audio signal is converted into, from the ATM cells relative to the above analog audio signal so to supply the data to the AD/DA converter 13. The ATM cell converter 17 extracts the high-speed digital data from the ATM cells relative to the high-speed digital data so to supply the data to the high-speed digital data apparatus 11. The AD/DA converter 13 converts the digital data received from the line concentrator 14 into an analog audio signal and sends the analog audio signal to the analog telephone 10.

The operation of the ADSL system according to the first embodiment thus constituted will be described this time.

An analog audio signal 40 sent from the analog telephone 10 of the subscriber site is converted into a digital signal by the AD/DA converter 13, which is supplied to the line concentrator 14 within the apparatus 12 on the subscriber side as the digital data 42. While, high-speed digital data 41 from the high-speed digital data apparatus 11 on the subscriber side such as a personal computer for transferring the high-speed digital data is supplied to the line concentrator 14 within the apparatus 12 on the subscriber side.

The above digital data 42 is converted into an ATM cell string 43 by the ATM cell converter 16 in the line concentrator 14, and the individual destination addresses (VPI/VCI) are attached to the ATM cells. The above high-speed digital data 41 is converted into an ATM cell string 44 by the ATM cell converter 17 within the line concentrator 14 and the individual destination addresses (VPI/VCI) are attached to the ATM cells.

The respective ATM cell strings 43 and 44 with the individual destination addresses (VPI/VCI) attached thereto are supplied to the line concentrating unit 18 for time division and converted into an ATM cell string 45, which is supplied to the ADSL modem 15.

The ADSL modem 15 modulates the ATM cell string 45 and sends the modulated signal 46 to the subscriber line 27.

When the signal 46 is transferred from the apparatus 12 on the subscriber side to the station side as mentioned above, the ADSL modem 21 of the apparatus 20 on the station side demodulates the same signal 46 and extracts the ATM cell string 47 therefrom, then to send it to the line concentrator 22. The line concentrator 22, upon receipt of the ATM cell string 47, confirms the attached destination addresses (VPI/VCI).

Thus, the line concentrator 22 sends the ATM cell string 48 with the address destined for analog telephone network 25 attached there to the analog telephone network 25 and sends the ATM cell string 49 with the address destined for the high-speed digital data network 26 attached there to the high-speed digital telephone; network 26.

On the other hand, the line concentrator 22 within the apparatus 20 on the station side attaches the different destination addresses (VPI/VCI) to an ATM cell string 38 relative to the audio data transferred through the analog telephone network 25 and an ATM cell string 39 relative to the high-speed digital data transferred through the high-speed digital data network 26, concentrates the data on lines in a way of time division, and sends the same to the ADSL modem 21 as an ATM cell string 37. The ADSL modem 21 modulates the ATM cell string 37 to create a signal 36, and sends it to the apparatus 12 on the subscriber side through the subscriber line 27.

The ADSL modem 15 within the apparatus 12 on the subscriber side demodulates the signal 36 and extracts an ATM cell string 35, hence to send it to the line concentrating unit 18. Upon receipt of the ATM cell string 35, the line concentrating unit 18 confirms the destination address (VPI/VCI) of each ATM cell of the string 35.

Thus, the line concentrating unit 18 sends an ATM cell string 33 with the address destined for the analog telephone 10 attached there to the ATM cell converter 16 and sends an ATM cell string 34 with the address destined for the high-speed digital data apparatus 11 to the ATM cell converter 17.

The ATM cell converter 16 extracts a payload from the ATM cell string 33 and sends the extracted digital data 32 to the AD/DA converter 13. The AD/DA converter 13 converts the digital data 32 into an analog signal and reconstructs an analog audio signal 30, hence to send it to the analog telephone 10. While, upon receipt of the ATM cell string 34, the ATM cell converter 17 extracts a payload from the ATM cell string 34 and sends the extracted high-speed digital data 31 to the high-speed digital data apparatus 11.

According to the embodiment, an analog audio signal transferred through an analog telephone, after being converted into digital, is transferred in a time-division multiplex way together with high-speed digital data, thereby making it possible to transfer an analog audio signal and high-speed digital data through one subscriber line, without setting POTS splitters on the subscriber side and the channel side, which have been required in the conventional ADSL system.

The present invention is not restricted to the above-mentioned embodiment but the following variations can be considered.

Figure 2:
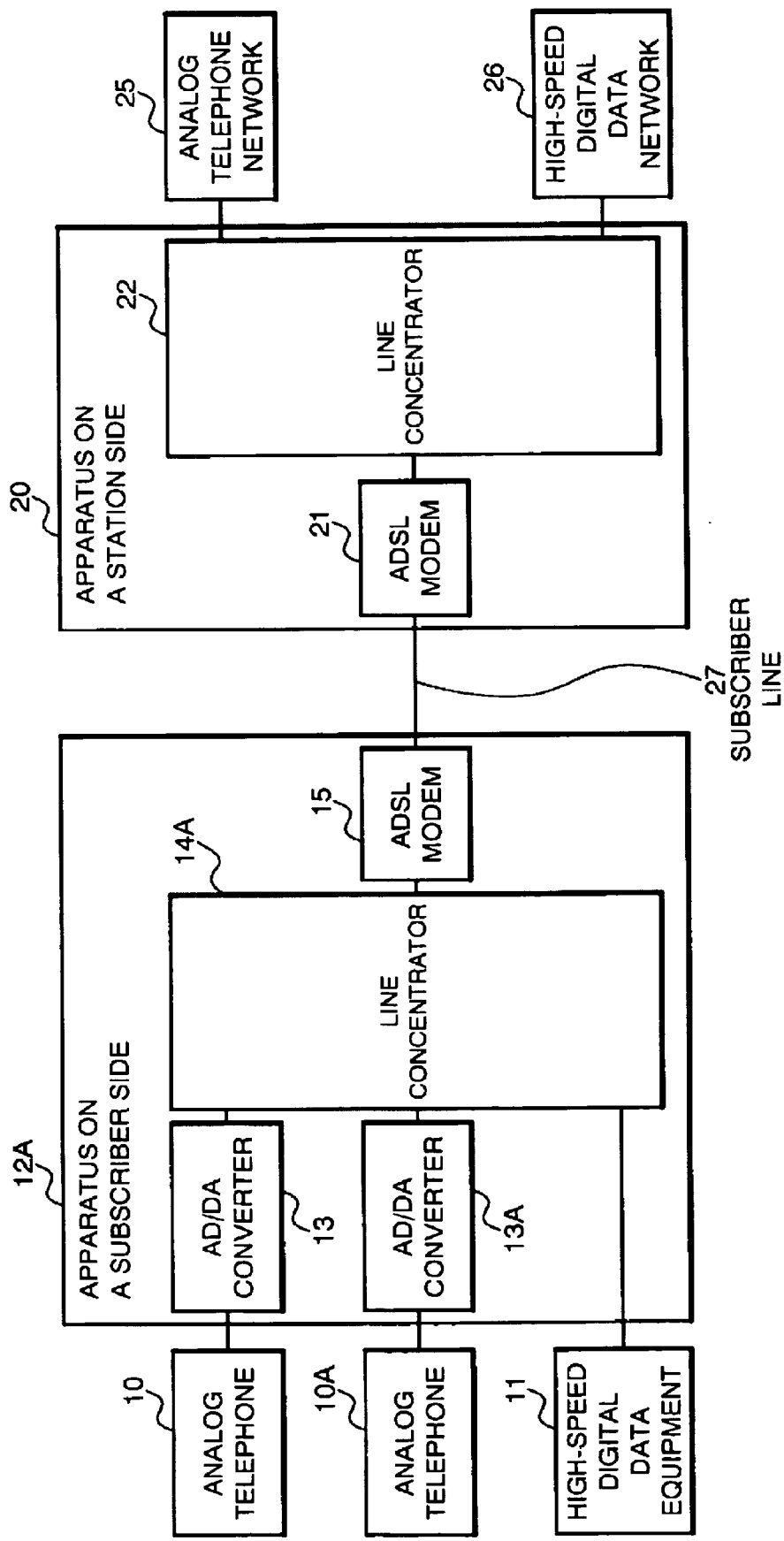
FIG. 2 is a block diagram showing the structure of an ADSL system according to a second embodiment of; the present invention.
Figure 3:
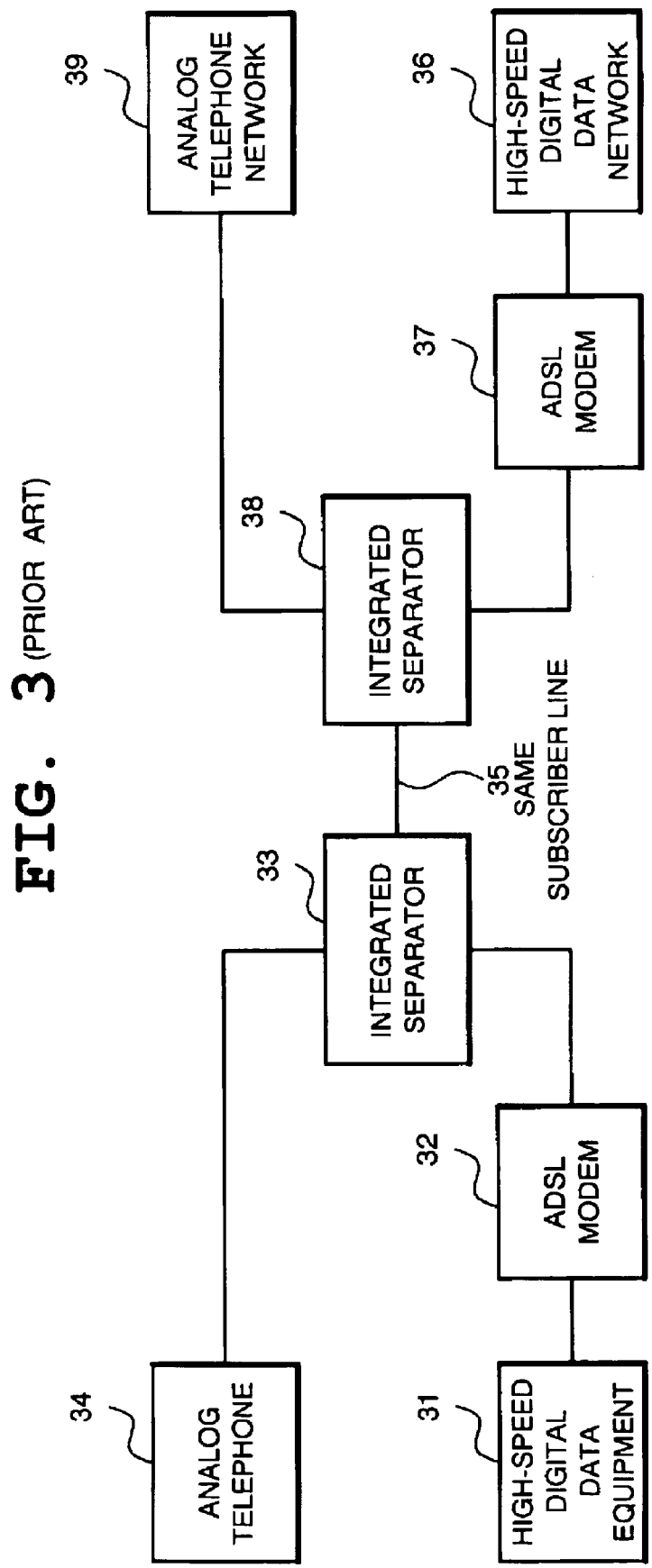
FIG. 3 is a block diagram showing the structure of the conventional ADSL system.

A. For example, as for two analog telephones 10 and 10A, an apparatus 12A on a subscriber side may be considered as illustrated in FIG. 2. Namely, in the structure of FIG. 2, respective AD/DA converters 13 and 13A are provided to the respective analog telephones 10 and 10A, digital audio signals supplied from the respective AD/DA converters 13 and 13A and high-speed digital data supplied from the high-speed digital data apparatus 11 are converted into ATM cells by a line concentrator 14A, and the line concentrator 14A concentrates the data on lines in a way of time division.

In FIG. 2, the components with the same reference numerals attached thereto are identical to those of FIG. 1.

B. Though the line concentrator 14 of the above embodiment converts the high-speed digital data and the digital audio signal supplied from the AD/DA converter 13 into ATM cells and concentrates the data on lines, it is also possible to divide the digital audio signal and the high-speed digital data not into ATM cells but into fixed time slots of 64 kbps, hence to transfer the same through the subscriber line 27.

Although the above embodiment has been described by use of an analog telephone, it is needless to say that analog communication equipment other than a telephone may be used.

As set forth hereinabove, the ADSL system of the present invention can achieve the following effects.

At first, since the POTS splitter consists of coils and a condenser of large size, especially, the station side had to accommodate a large number of subscribers, thereby increasing the volume of the POTS splitter within the station side. In the present invention, however, since an AD/DA converter and a line concentrator that are requisite components can be realized by LSI, downsizing of the system can be realized especially in the station side.

At second, although in order to set a POTS splitter on a subscriber side, a constructor had to go to the subscriber site to do setting and wiring works, an AD/DA converter and a line concentrator that are requisite components for the present invention can be realized by LSI and they are easily built in an apparatus of a subscriber site. According to the present invention, it is possible for a subscriber to set the system by himself or herself, like in the case of setting an analog modem of 28 kbps or 56 kbps in the subscriber site. Therefore, the present invention can provide a subscriber with easy setting and provide the station side with reduction of labor costs for dispatching a constructor.

At third, when setting a POTS splitter on an existing analog telephone network, it was necessary to optimize the design of the POTS splitter not to disturb the quality of the subscriber line. The present invention, however, requires no POTS splitter on the side of a subscriber, such optimization is not necessary.

At fourth, although it was necessary to design a POTS splitter suitable for terminal impedance of each country in order to optimize the POTS splitter because the terminal impedance of a subscriber line varies depending on each country, the present invention has the structure in common with each country, thereby decreasing the development costs and the development time compared with the case of developing a POTS splitter.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An asymmetrical digital subscriber line (ADSL) system for transferring an analog audio signal of an analog communication equipment and high speed digital data of a high speed digital data equipment provided on the side of a subscriber, from and to a station, through one subscriber line, said system comprising:

an apparatus on the subscriber side in which an analog audio signal of the analog communication equipment is converted into a digital audio signal, said subscriber side apparatus comprising a line concentrator to concentrate the digital audio signal together with the high-speed digital data by time division, and supplied to the subscriber line after being modulated by a first ADSL modem, while after a signal received from the station through the subscriber line is demodulated by the first ADSL modem, the digital audio signal is converted into an analog audio signal and supplied to the analog communication equipment, and at the same time high-speed digital data is supplied to the high-speed digital data equipment;

an apparatus on the station side in which a signal received from said apparatus on the subscriber side through the subscriber line is demodulated by a second ADSL modem, thereafter the digital audio signal is converted into an analog audio signal, which is supplied to an analog telephone network, and at the same time high-speed digital data is supplied to a high-speed digital data network, while an analog audio signal of the analog telephone network is converted into a digital audio signal, said station side apparatus comprising a line concentrator to concentrate the digital audio signal together with high-speed digital data of the high-speed digital data network by time division, and supplied to the subscriber line after being modulated by the second ADSL modem; and a subscriber line interconnected directly between said first ADSL modem in said apparatus on the subscriber side and said second ADSL modem in said apparatus on the station side, with no intervening equipment, wherein said apparatus on the subscriber side and apparatus on the station side convert each digital audio signal as well as each high-speed digital data into asynchronous transfer mode (ATM) cells in each respective line concentrator and attach each destination address to the ATM cells.

2. An ADSL system as set forth in claim 1, wherein said apparatus on the subscriber side converts each analog audio signal of a plurality of analog communication equipment into each digital audio signal and concentrates the digital audio signal together with the high-speed digital data by time division.

3. An ADSL system as set forth in claim 1, wherein said apparatus on the subscriber side and said apparatus on the station side convert each digital audio signal as well as each high-speed digital data into ATM cells, attach each destination address to the ATM cells in the line concentrator, and concentrate the digital audio signal together with the high-speed digital data.

4. An ADSL system as set forth in claim 1, wherein said apparatus on the subscriber side converts each analog audio signal of a plurality of analog communication equipment into each digital audio signal and concentrates the digital audio signal together with high-speed digital data by time division, and said apparatus on the subscriber side and apparatus on the station side convert each digital audio signal as well as each high-speed digital data into ATM cells, attach each destination address to the ATM cells in the line concentrator, and concentrate the digital audio signal together with the high-speed digital data.

5. An ADSL system as set forth in claim 1, wherein said apparatus on the subscriber side and apparatus on the station side divide each digital audio signal as well as high-speed digital data into fixed time slots and the digital audio signal together with the high-speed digital data is supplied to the subscriber line after being modulated by the first ADSL modem.

6. An ADSL system as set forth in claim 1, wherein said apparatus on the subscriber side converts each analog audio signal of a plurality of analog communication equipment into each digital audio signal and concentrates the digital audio signal together with high-speed digital data by time division, and said apparatus on the subscriber side and apparatus on the station side divide each digital audio signal as well as high-speed digital data into fixed time slots and the digital audio signal together with the high-speed digital data is supplied to the subscriber line after being modulated by the ADSL modem.

7. ADSL system as set forth in claim 1, wherein said line concentrator in said subscriber side apparatus and said line concentrator in said station side apparatus each comprises an ATM cell converter, and wherein individual destination addresses are attached to each ATM cell.

8. An asymmetrical digital subscriber line (ADSL) system for transferring an analog audio signal of an analog communication equipment and high speed digital data of a high speed digital data equipment provided in an apparatus on a subscriber side, from and to an apparatus on a station side, through one subscriber line, said system comprising:

said apparatus on the subscriber side comprising:

an analog-to-digital/digital-to-analog (AD/DA) converter for converting an analog audio signal of the analog communication equipment into a digital audio signal or converting a digital audio signal into an analog audio signal, to supply the analog audio signal to the analog communication equipment, and supplying the high-speed digital data to the high-speed digital data equipment;

a line concentrator for concentrating the digital audio signal and the high-speed digital data by time division; and a first ADSL modem for modulating the digital audio signal and the high-speed digital data and supplying the modulated signal to the subscriber line, and demodulating a modulated signal received from the station side through the subscriber line;

said apparatus on the station side comprising:

a second ADSL modem for demodulating the modulated signal received from said apparatus on the subscriber side through the subscriber line and modulating a digital audio signal and high-speed digital data to be supplied to the subscriber line; and a line concentrator for supplying the digital audio signal modulated by said second ADSL modem to an analog telephone network as well as supplying the high-speed digital data to the high-speed digital data network, and concentrating the digital audio signal from the analog telephone network and the high-speed digital data from the high-speed digital data network by time division, then to send the digital audio signal together with the high-speed digital data to said first ADSL modem; and said subscriber line interconnects directly said first ADSL modem and said second ADSL modem, with no intervening equipment, wherein said apparatus on the subscriber side and said apparatus on the station side convert each digital audio signal and the high-speed digital data into asynchronous transfer mode (ATM) cells in each respective line concentrator and attach a destination address to the ATM cells.

9. An ADSL system as set forth in claim 8, wherein said apparatus on the subscriber side comprises a plurality of ones of the AD/DA converters corresponding to a plurality of analog communication equipment; and said line concentrator in said apparatus on the subscriber side concentrates each digital audio signal converted by the plurality of AD/DA converters, together with the high-speed digital data, by time division.

10. An ADSL system as set forth in claim 8, wherein said line concentrators in said apparatus on the subscriber side and in said apparatus on the station side convert digital audio signals and high-speed digital data into ATM cells in the line concentrators, attach each destination address to the ATM cells and concentrate the digital audio signal together with the high-speed digital data.

11. An ADSL system as set forth in claim 8, wherein said apparatus on the subscriber side comprises a plurality of ones of the AD/DA converter corresponding to a plurality of analog communication equipment, and said line concentrators in said apparatus on the subscriber side and in said apparatus on the station side convert digital audio signals and high-speed digital data into ATM cells, attach each destination address to the ATM cells in the line concentrator, and concentrate the digital audio signal together with the high-speed digital data.

12. An ADSL system as set forth in claim 8, wherein said line concentrators in said apparatus on the subscriber side and in said apparatus on the station side divide each digital audio signal and high-speed digital data into fixed time slots, and the digital audio signal together with the high-speed digital data is supplied to the subscriber line after being modulated by said ADSL modem.

13. An ADSL system as set forth in claim 8, wherein said apparatus on the subscriber side comprises a plurality of ones of the AD/DA converter corresponding to a plurality of analog communication equipment, and said line concentrators in said apparatus on the subscriber side and in said apparatus on the station side divide each digital audio signal and high-speed digital data into fixed time slots, the digital audio signal together with the high-speed digital data is supplied to the subscriber line after being modulated by said ADSL modem.

14. An ADSL system as set forth in claim 8, wherein each said first and second line concentrator comprises an ATM cell convertor, and wherein individual destination addresses are attached to each ATM cell.

15. A method of transferring an analog audio signal over an asymmetrical digital subscriber line (ADSL) containing high-speed digital data, said method comprising:

providing a subscriber service via an apparatus on a subscriber side of the network receiving as inputs an analog audio signal of an analog communication device and high-speed digital data of a high-speed digital data device, said providing subscriber service comprising:

converting the analog audio signal into a digital audio signal;

converting each digital audio signal and each high-speed data into asynchronous transfer mode (ATM) cells in a line concentrator;

attaching each destination address to each ATM cell;

concentrating said converted digital audio signals together with said converted high-speed digital data into an ATM cell string signal using time division;

modulating said ATM cell string with a first ADSL modem; and transmitting said modulated ATM cell string signal to the subscriber line; and receiving the ATM signal from said subscriber side into an apparatus on the station side, said receiving comprising:

demodulating said ATM signal with a second ADSL modem located in said apparatus on the station side;

converting said concentrated digital audio signal into an analog audio signal;

transmitting said analog audio signal to an analog telephone network; and transmitting said concentrated high-speed digital data to a high-speed digital network, wherein said first ADSL modem is interconnected directly to said second ADSL modem via a subscriber line, with no intervening equipment.

16. The method of claim 15, further comprising:

dividing each digital audio signal and each high-speed digital data into fixed time slots; and supplying said divided digital audio signals together with said high speed digital data to said subscriber line after modulation by said first ADSL modem.

17. The method of claim 15, further comprising:

extracting a payload from said ATM cell string and converting said extracted digital audio signals into analog audio signals.

18. The method of claim 15, wherein said concentrating said converted digital audio signals together with said converted high-speed digital data using time division comprises multiplexing said signals and said data in a multiplexer.

19. The method of claim 15, wherein said concentrating said converted digital audio signals together with said converted high-speed digital data comprises modulating said ATM cells received from said line concentrator.

20. The method of claim 15, further comprising:

transmitting an ATM cell string having an address attached for the analog telephone network by said second line concentrator to said analog telephone network; and transmitting an ATM cell string having an address attached for the high-speed digital network to a high speed digital telephone network.

* * * * *